F. E. BROWN & J. R. SHANGLE.
Corn-Shellers.

No. 138,125.                 Patented April 22, 1873.

Witnesses
George Upham.
Jos. B. Loomis.

Inventor.
F. E. Brown,
J. R. Shangle,
Chipman Hosmer & Co.
Attys

UNITED STATES PATENT OFFICE.

FRANKLIN E. BROWN AND JOHN R. SHANGLE, OF HIGHTSTOWN, N. J.

IMPROVEMENT IN CORN-SHELLERS.

Specification forming part of Letters Patent No. 138,125, dated April 22, 1873; application filed October 5, 1872.

*To all whom it may concern:*

Be it known that we, FRANKLIN E. BROWN and JOHN R. SHANGLE, of Hightstown, in the county of Mercer and State of New Jersey, have invented a new and valuable Improvement in Corn-Shellers; and we do hereby declare that the following is full, clear, and exact description of the construction and operation of the same, reference being had to the annexed drawing making a part of this specification and to the letters and figures of reference marked thereon.

Figure 1:
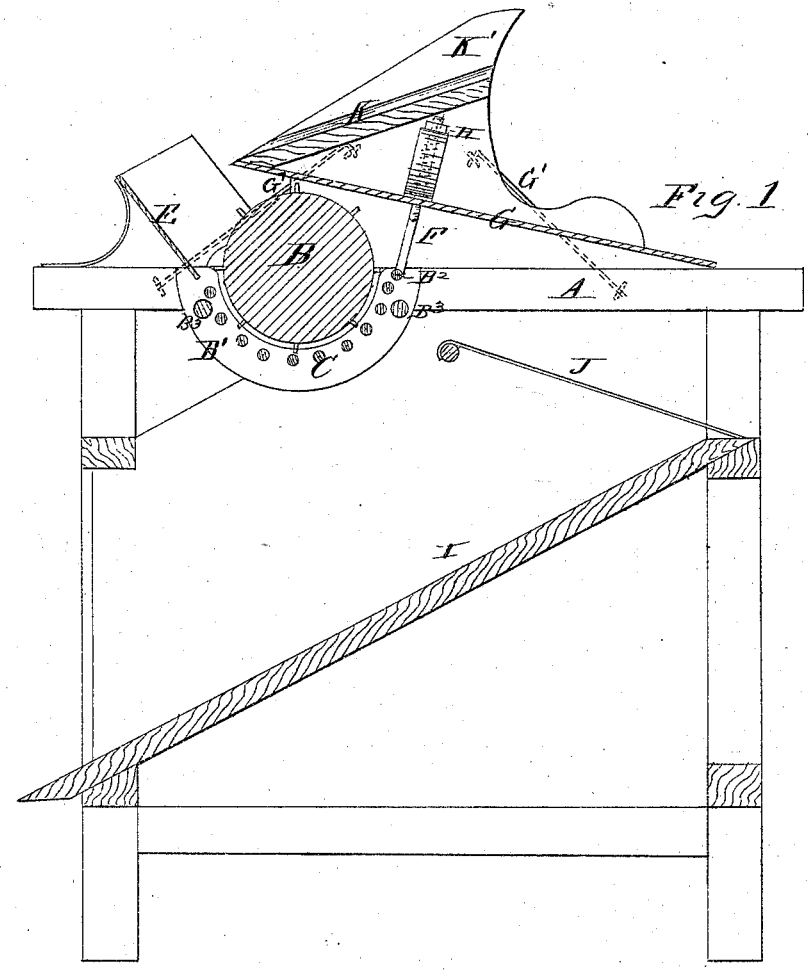
Figure 2:

Figure 1 of the drawing is a representation of a sectional view of our invention. Fig. 2 is a detail view of the same.

This invention has relation to corn-shellers; and it consists in the construction and novel arrangement of the springs which regulate the position and pressure of the roller-apron, between which and the studded cylinder the corn is shelled, all substantially as hereinafter more fully described.

Referring to the drawing, A designates the main frame of the corn-sheller; B, a studded shelling-cylinder; C, a series of thin rollers attached to plates $B^1$, having their forward ends pivoted to the sides of the frame A. These rollers are arranged in a semicircular row below the studded cylinders, as shown. The two plates $B^1$ are connected and braced by means of transverse rods $B^2$ $B^3$. The corn on the cob passes from the hopper E in front of and underneath the studded cylinder, and is shelled between the latter and the rollers C. F are rods attached to the bar $B^2$, thence passing upward through an inclined plate, G. The upper parts of said rods are threaded, and hold nuts H, the use of which is to regulate the force of the spiral springs $h$ encircling the rods, and the semi-elliptic equalizing-spring $h'$. The spring $h'$ is secured at its center to the plate G, while its ends fall over the rods F and rest upon the spiral springs. The nuts are placed upon the ends of the semi-elliptic spring, and, when turned, regulate both the spiral and semi-elliptic springs together. The rods, nuts, and spiral springs are designed especially to adjust the rollers C to suit the size of the ears, the springs allowing sufficient flexibility for large ears to pass through, and to prevent clogging. The spring $h'$ serves to equalize force of the spiral springs, and to increase their power. The shelled corn falls between the rollers C and into a spout, I. J represents a screen or sieve, over which the cobs pass as they issue from underneath the studded roller. The shelled corn carried out with the cobs falls through said sieve to the spout I. K designates an inclined feeder having raised sides K' and attached to the frame A above the plate G by means of hooks G' hinged to said frame. This feeder is inclined in the opposite direction of the hopper, and is used for the purpose of enabling the attendant to spread and properly feed the ears to the cylinder. This feeder may be removed by releasing the hooks.

What we claim as our invention, and desire to secure by Letters Patent, is—

In a corn-sheller, the semi-elliptic equalizing-spring $h'$ secured to the plate G, in combination with the rods F, nuts H, spiral springs $n$, pivoted plates B' provided with the rollers C, and the shelling-cylinder B, substantially as specified.

In testimony that we claim the above we have hereunto subscribed our names in the presence of two witnesses.

FRANKLIN E. BROWN.
    JOHN R. SHANGLE.

Witnesses:
  JACOB EARLY,
  THOMAS M. SCROGGY.